United States Patent
Laurent

(10) Patent No.: US 7,350,313 B2
(45) Date of Patent: Apr. 1, 2008

(54) DEVICE FOR CUTTING AND MARKING A METAL CABLE

(75) Inventor: Didier Laurent, Fronton (FR)

(73) Assignee: Labinal, Montigny le Bretonneux (FR)

( * ) Notice: Subject to any disclaimer, the term of this patent is extended or adjusted under 35 U.S.C. 154(b) by 0 days.

(21) Appl. No.: 11/249,519

(22) Filed: Oct. 14, 2005

(65) Prior Publication Data
US 2006/0080853 A1 Apr. 20, 2006

(30) Foreign Application Priority Data
Oct. 19, 2004 (FR) ................................. 04 11045

(51) Int. Cl.
*G01D 21/00* (2006.01)
(52) U.S. Cl. ............................. 33/631; 33/666; 30/131; 7/158
(58) Field of Classification Search ................. 33/631, 33/501.5, 628, 630, 41.1, 41.6, 44, 666, 669, 33/677, 501, 5, 41, 1; 7/107, 129–135, 142, 7/163, 164, 158; 83/522.19, 673, 862–865; 30/123, 254, 131
See application file for complete search history.

(56) References Cited

U.S. PATENT DOCUMENTS

| | | | | |
|---|---|---|---|---|
| 276,793 | A * | 5/1883 | Phillips | 7/128 |
| 447,475 | A * | 3/1891 | Pomeroy | 33/201 |
| 508,453 | A * | 11/1893 | Waldie | 33/631 |
| 803,151 | A * | 10/1905 | Holloway | 33/631 |
| 1,082,385 | A * | 12/1913 | Zimmerman | 30/233 |
| 1,263,492 | A * | 4/1918 | Washburn | 30/131 |
| 1,381,024 | A | 6/1921 | Shaul | |
| 1,446,380 | A * | 2/1923 | De Laney | 33/631 |
| 1,891,482 | A * | 12/1932 | Reichhelm | 30/91.2 |
| 2,328,747 | A * | 9/1943 | Schweidler | 7/158 |
| 2,408,517 | A * | 10/1946 | Howard | 33/21.3 |
| 2,541,435 | A * | 2/1951 | Nock | 401/10 |
| 2,668,464 | A * | 2/1954 | Paules | 30/91.2 |
| 3,654,647 | A * | 4/1972 | Neff | 7/107 |
| 3,667,129 | A * | 6/1972 | Aspel | 33/666 |
| 3,840,989 | A * | 10/1974 | Hexdall | 30/231 |
| 3,947,905 | A * | 4/1976 | Neff | 7/107 |
| 4,349,928 | A * | 9/1982 | Mlikotin | 7/157 |
| 4,951,529 | A * | 8/1990 | Laurencot | 81/9.43 |
| 5,065,527 | A * | 11/1991 | Shaw | 33/734 |
| 5,245,721 | A * | 9/1993 | Lowe et al. | 7/129 |
| 6,272,754 | B1 * | 8/2001 | Hesprich | 30/232 |
| 6,574,881 | B2 * | 6/2003 | Cole, III | 33/668 |
| 7,171,712 | B2 * | 2/2007 | Konen | 7/107 |
| 2007/0079445 | A1* | 4/2007 | Siebeck | 7/129 |

FOREIGN PATENT DOCUMENTS

| | | |
|---|---|---|
| FR | 898.730 | 5/1945 |
| FR | 1.443.560 | 6/1966 |

\* cited by examiner

*Primary Examiner*—G. Bradley Bennett
*Assistant Examiner*—Tania C Courson
(74) *Attorney, Agent, or Firm*—Oblon, Spivak, McClelland, Maier & Neustadt, P.C.

(57) ABSTRACT

Device for cutting and marking a metal cable (16), comprising means (12, 18) for cutting the cable (16) and marking means (20) for marking the cable (16) with a mark at a predetermined distance (d) from the cutting plane (C), cutting and marking being simultaneous.

31 Claims, 1 Drawing Sheet

DEVICE FOR CUTTING AND MARKING A METAL CABLE

The invention relates to a device for cutting and marking a metal cable, in particular an electrical cable, this device comprising means for supporting and guiding the cable and at least one lever pivoted on these support means and having a cutting edge which can be moved toward the support so as to cut the cable.

The connection of an electrical cable to any part must comply with a regulation concerning the length of the cable used for the connection proper, i.e. the length of cable that must be inserted in an opening or passage in the part so that the connection is correct, this length varying depending on the diameter of the electrical cable.

According to conventional methods, the cable is first cut using cutting pliers or a similar suitable tool, and then the cut cable is placed on a marking template and a mark is made on it at a predetermined distance from its cut end, for example using an indelible ink pen.

The cutting and marking are therefore performed one after the other and require the use of different tools. The marking operation takes at least as long as the cutting operation and results in a loss of time which may be very great when the number of cables to be processed is high.

The present invention has the particular aim of providing a simple, effective and economical solution to this problem.

In this regard it proposes a device for cutting and marking a metal cable, in particular an electrical cable, comprising means for supporting and guiding the cable and at least one lever pivoted on the support means and having a cutting edge which can be moved toward the support means so as to cut the cable held by the support means, which device also comprises means for marking the cable, which are borne by said lever so as to come into contact with the cable and mark it at the same time as the cutting edge cuts the cable.

By virtue of the device according to the invention, the cable is cut and marked simultaneously, using the same tool. This results in an appreciable saving of time and increase in productivity.

Moreover, cutting and marking the cable simultaneously eliminates the risk of omitting to mark the cables after they have been cut.

The marking means are positioned on the abovementioned lever at a distance from the cutting edge in the direction of the means for supporting and guiding the cable, the distance between the marking means and the cutting edge being determined as a function of the diameter of the cable, so as to comply with the abovementioned regulation on the connection of electrical cables.

Preferably, the marking means are mounted on the lever using elastically deformable means, to prevent any risk of damage to the marking means when the cable is cut.

In one embodiment of the invention, the marking means comprise a container containing a quick-drying colored liquid, such as an ink, a paint, a varnish or the like, these marking means consisting, inexpensively, of a felt-tip pen, which is mounted in a tubular support borne by the lever.

Advantageously, this tubular support contains a spring for moving the pen longitudinally in the opposite direction to the cable support means, thus preventing any risk of the felt tip being crushed on the cable during marking.

As a variant, the marking means may be of the ink pad type, for example for marking the cable with a traceability sign or mark.

The device according to the invention advantageously takes the form of a pair of pliers with two jaws, the first of which bears the means for supporting and guiding the cable and the second of which bears the marking means and comprises a cutting blade or edge.

The means for supporting and guiding the cable consist for example of a plate fixed to the first jaw and having a groove for receiving the cable, this groove running substantially perpendicular to the cutting plane defined by the two jaws.

The means for supporting the marking means are then fixed to the second jaw opposite the groove in the cable support and guide plate, being fixed removably and with possibility of adjustment.

The invention will be more clearly understood on reading the description that follows, provided by way of example and with reference to the attached drawings, in which.

Figure 1:
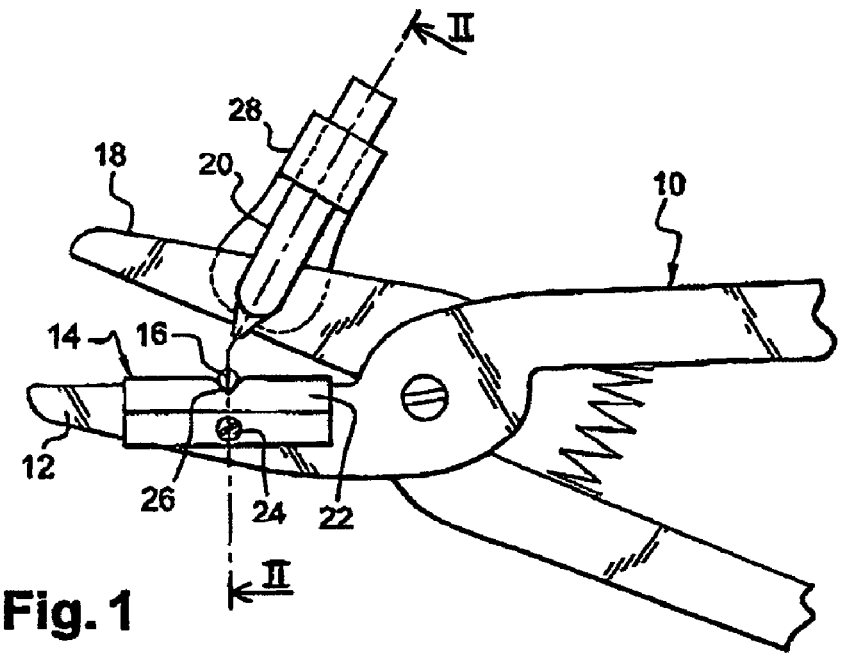
FIG. 1 is a schematic partial view from the front of a device according to the invention.

The device according to the invention shown in the drawings essentially consists of cutting pliers 10 of the usual kind, a first jaw 12 of which, advantageously the lower jaw, bears means 14 for supporting and guiding a cable 16, and the other jaw 18 of which, in this case the upper jaw, bears means 20 for marking the cable 16, these means 20 being designed to mark the cable 16 with a mark at a distance d from the cutting plane C defined by the jaws 12, 18 of the pliers 10.

The support and guide means 14 for the cable 16 comprise, for example, a plate 22 which is fixed to the outer lateral face of the lower jaw 12 using a screw 24 and which comprises, on its upper face, a V-shaped groove 26 for receiving and guiding the cable 16, this groove 26 running along the whole length of the plate 22 in a direction perpendicular to the cutting plane C defined by the jaws 12, 18, of the pliers 10.

The marking means 20 advantageously consist of a felt-tip pen housed in a tubular support 28 mounted in any appropriate manner, for example by clip-fastening, on an attachment 30 fixed, for example using a screw 32, to the inner lateral face of the upper jaw 18 of the pliers.

The pen 20 contained in the tubular support 28 is stressed axially downwards, i.e. in the direction of the support and guide means 14 for the cable 16, by a spring 34 mounted between the closed upper end of the support 28 and the upper end of the pen 20.

The downward movement of the pen 20 is limited by the abutment of a shoulder 36 of the pen body on an inner edge 38 of the lower end of the support 28.

The way in which the device according to the invention works is obvious from the foregoing: the cable to be cut 16 is placed in the groove 26 in the means 14, then the pliers are clamped to bring the two jaws 12, 18 together. When the cutting edge 40 formed on the jaw 18 comes into contact with the cable 16 in order to cut it, the tip 42 of the pen 20 is pressed on this cable at a distance d from the cutting plane C.

Figure 2:
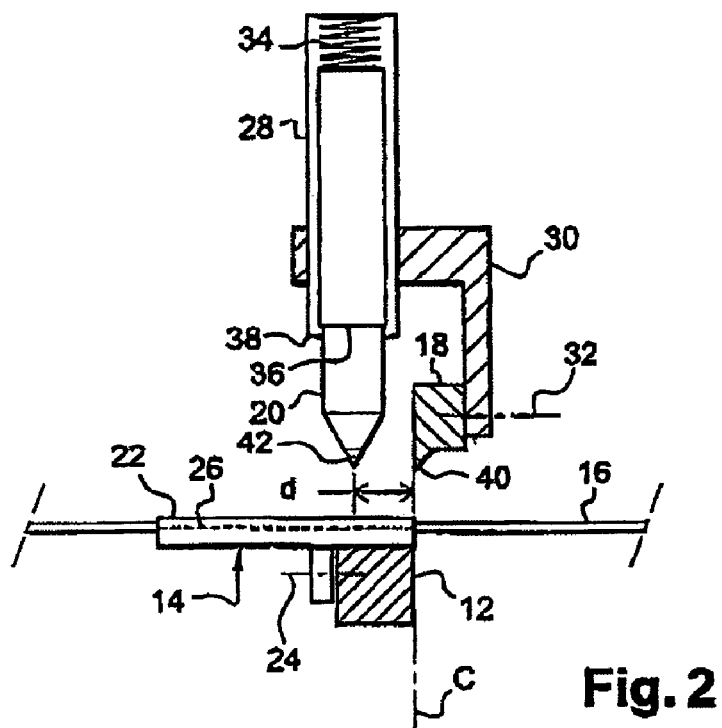
FIG. 2 is a schematic view of this device on a larger scale and in section on the line II-II of FIG. 1.

Any risk of the tip 42 being crushed against the cable 16 is avoided thanks to the ability of the pen 20 to retract in the tubular support 28, owing to the compression of the spring 34 which, when the pliers 10 are subsequently opened, brings the pen 20 back into the position shown in FIG. 2.

It is possible to adapt the device according to the invention to cables 16 of different diameters by modifying the distance d between the cutting plane C and the tip of the pen 20.

To do this, the pen support 28 may be mounted on attachments 30 of different sizes, or alternatively several positions may be envisaged for clip-fastening the support 28 on the abovementioned attachment 30.

It is also possible to provide for various devices according to the invention, each adapted to a cable diameter.

Naturally, the device according to the invention may take a form other than that of cutting pliers, for example the form of a tool mounted on a fixed support. In this case, the cable support and guide means 14 are borne or formed by the fixed support and the marking means 20 are borne by a lever pivoted on this fixed support and comprising a cutting edge.

The invention claimed is:

1. A device for cutting and marking a cable comprising:
   a support;
   means for supporting and guiding the cable, the means for supporting and guiding the cable being mounted on the support;
   at least one lever pivotably attached to the support at a pivot point such that the at least one lever is configured to pivot relative to the means for supporting and guiding, the at least one lever having a cutting edge configured to move toward the means for supporting and guiding to cut the cable; and
   means for marking the cable, the means for marking the cable being mounted on the at least one lever at a location other than the pivot point, such that the means for marking the cable is borne by the at least one lever and configured to come into contact with the cable and mark the cable at a same time as the cutting edge cuts the cable.

2. The device as claimed in claim 1, wherein the means for marking is positioned on the at least one lever at a distance from the cutting edge in a direction substantially parallel to the cable supported and guided by the means for supporting and guiding the cable.

3. The device as claimed in claim 2, wherein the distance between the means for marking and the cutting edge is determined as a function of the diameter of the cable.

4. The device as claimed in claim 1, wherein the means for marking includes a container containing a quick-drying colored liquid.

5. The device as claimed in claim 1, further comprising:
   means for removably mounting the means for marking on the at least one lever.

6. The device claimed in claim 5, wherein the means for removably mounting the means for marking is elastically deformable.

7. The device as claimed in claim 1, wherein the means for marking includes a pen mounted in a tubular support, the tubular support borne by the at least one lever and containing a spring configured to move the pen longitudinally in the tubular support.

8. The device as claimed in claim 1,
   wherein the support is a first plier lever of a pair of pliers such that the means for supporting and guiding the cable is borne by the first plier lever of the pair of pliers,
   wherein the at least one lever is a second plier lever of the pair of pliers, and
   wherein the first plier lever and the second plier lever include a first jaw and a second jaw, respectively.

9. The device as claimed in claim 8, wherein the means for supporting and guiding the cable includes a plate fixed to the first jaw, the plate having a groove configured to receive the cable, which runs substantially perpendicular to a cutting plane defined by the first jaw and the second jaw.

10. The device as claimed in claim 9, wherein the means for marking is fixed to the second jaw opposite the groove in the plate.

11. The device as claimed in claim 9, wherein the means for marking is fixed to an inner lateral face of the second jaw.

12. The device claimed in claim 1, wherein the cable includes metal.

13. The device claimed in claim 1, wherein the cable is an electrical cable.

14. The device claimed in claim 1, wherein the means for supporting and guiding the cable is a guide plate including a groove configured to receive a cable.

15. The device claimed in claim 1, wherein the means for marking the cable is mounted on the at least one lever on a same side of the pivot point as the cutting edge.

16. The device claimed in claim 1, wherein the means for marking the cable is configured to pivot with the at least one lever when the at least one lever moves towards the means for supporting and guiding to cut the cable.

17. The device as claimed in claim 1, wherein the support is a fixed support.

18. The device as claimed in claim 1, wherein the means for marking the cable is spaced from a pivot axis about which the at least one lever is configured to pivot relative to the support.

19. The device as claimed in claim 1, wherein the means for marking the cable is mounted on the at least one lever between the pivot point and a distal end of the at least one lever.

20. A device for cutting and marking a cable comprising:
    a support;
    a guide plate mounted on the support, the guide plate including a groove configured to receive a cable;
    at least one lever pivotably mounted on the support at a pivot point such that the at least one lever is configured to pivot relative to the guide plate, the at least one lever including a cutting edge configured to move toward the guide plate and configured to cut the cable; and
    a marking member mounted on the at least one lever at a location other than the pivot point and positioned to come into contact with the cable and mark it at the same time as the cutting edge cuts the cable.

21. The device for cutting and marking a cable claimed in claim 20, wherein the marking member is positioned on the at least one lever at a distance from the cutting edge determined as a function of the diameter of the cable in a direction substantially parallel to the groove on the guide plate.

22. The device for cutting and marking a cable claimed in claim 20, wherein the marking member is removably mounted on the at least one lever.

23. The device for cutting and marking a cable claimed in claim 20, wherein the marking member is mounted on the at least one lever on a same side of the pivot point as the cutting edge.

24. The device for cutting and marking a cable claimed in claim 20, wherein the marking member is configured to pivot with the at least one lever when the at least one lever moves towards guide plate to cut the cable.

25. The device for cutting and marking a cable claimed in claim 20, wherein the marking member is elastically mounted on the at least one lever.

26. The device for cutting and marking a cable claimed in claim 25, further comprising:
    a support member mounted on the at least one lever, the support member configured to contain the marking member; and an elastic member contained in the support member, the elastic member configured to move the marking member longitudinally in the support member.

27. The device for cutting and marking a cable claimed in claim 26, wherein the support member is tubular.

28. The device for cutting and marking a cable claimed in claim 26, wherein the elastic member is a spring.

29. The device for cutting and marking a cable claimed in claim 26, wherein the marking member is a felt-tipped pen.

30. The device for cutting and marking a cable claimed in claim 20, wherein the marking member is spaced from a pivot axis about which the at least one lever is configured to pivot relative to the support.

31. The device for cutting and marking a cable claimed in claim 20, wherein the marking member is mounted on the at least one lever between the pivot point and a distal end of the at least one lever.

* * * * *